United States Patent [19]

Marcks

[11] Patent Number: 5,102,433
[45] Date of Patent: Apr. 7, 1992

[54] PROCESS OF PURIFYING EXHAUST GASES

[75] Inventor: Roland Marcks, Bad Vilbel, Fed. Rep. of Germany

[73] Assignee: Metallgesellschaft Aktiengesellschaft, Frankfurt am Main, Fed. Rep. of Germany

[21] Appl. No.: 644,267

[22] Filed: Jan. 22, 1991

[30] Foreign Application Priority Data

Feb. 13, 1990 [DE] Fed. Rep. of Germany ....... 4004358

[51] Int. Cl.⁵ .............................................. B01D 53/14
[52] U.S. Cl. ................................................. 55/80; 55/89
[58] Field of Search ...................................... 55/80, 89

[56] References Cited

U.S. PATENT DOCUMENTS

| | | |
|---|---|---|
| 3,138,440 | 6/1964 | Weittenhiller et al. ................. 55/80 |
| 3,619,983 | 11/1971 | Rohr ................................... 55/89 |
| 3,619,985 | 11/1971 | Rohr ................................... 55/89 |
| 4,466,814 | 8/1984 | Herbort et al. ...................... 55/80 X |
| 4,472,179 | 9/1984 | Adrian et al. ....................... 55/80 X |
| 4,612,024 | 9/1986 | Müller-Odenwald ................. 55/80 |
| 4,682,990 | 7/1987 | Kågström et al. .................... 55/80 |
| 4,704,972 | 11/1987 | Marchand ............................ 55/80 X |
| 4,880,446 | 11/1989 | Dietz et al. .......................... 55/80 X |

FOREIGN PATENT DOCUMENTS

| | | |
|---|---|---|
| 50-046559 | 4/1975 | Japan ................................... 55/80 |
| 53-083972 | 7/1978 | Japan ................................... 55/80 |

*Primary Examiner*—Robert Spitzer
*Attorney, Agent, or Firm*—Michael J. Striker

[57] ABSTRACT

In order to suppress the formation of a plume by the exhaust gas which has been purified by wet scrubbing and has subsequently been reheated, it is proposed to effect an additional cooling of the exahust gas between the wet scrubber and the reheater so that part of the water is removed by condensation from the saturated exhaust gas after the wet scrubbing and it is ensured that a formation of a plume by the exahust gas as it enters the environment will be suppressed under all weather conditions which may be expected.

3 Claims, 2 Drawing Sheets

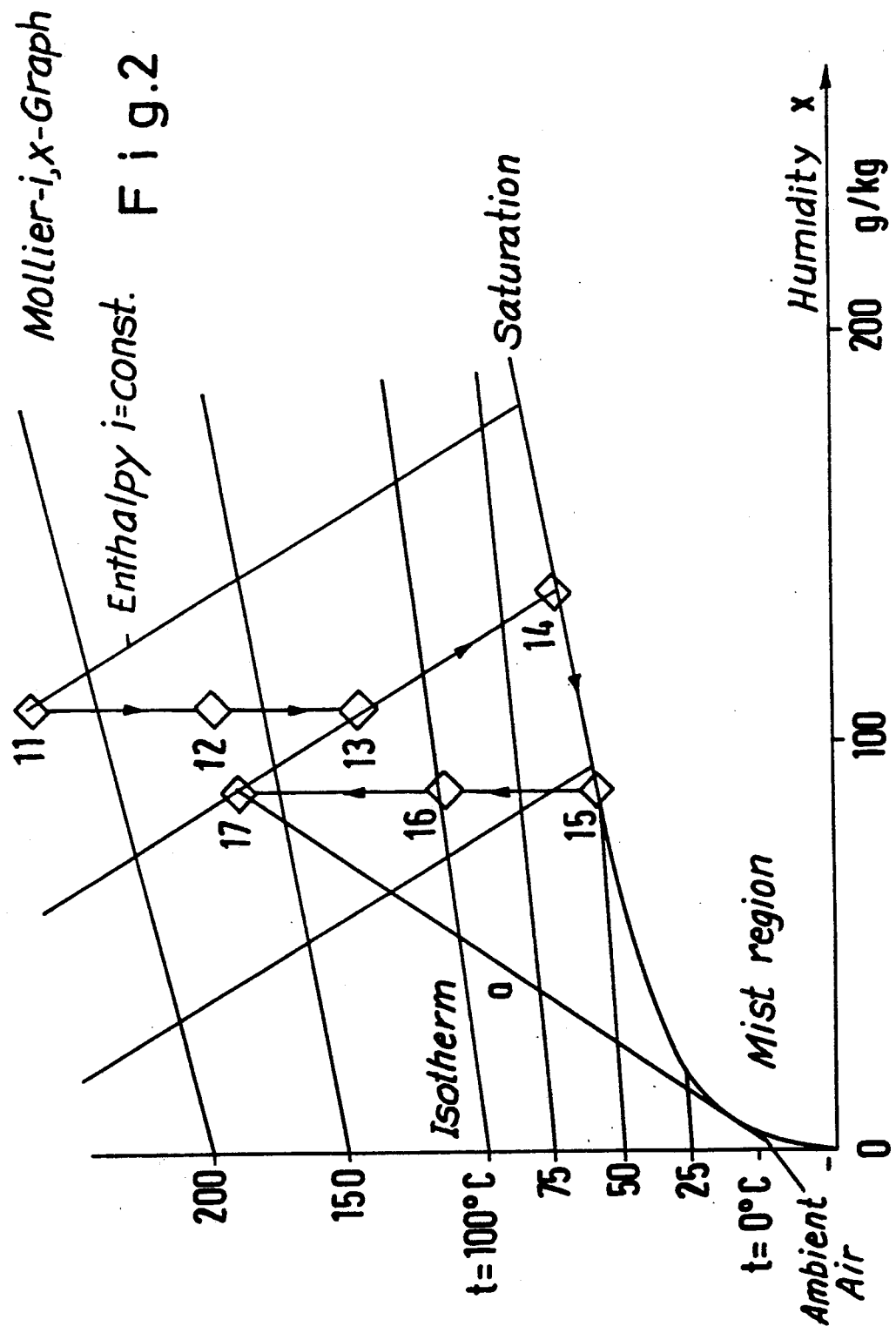

PROCESS OF PURIFYING EXHAUST GASES

BACKGROUND OF THE INVENTION

The present invention relates to a process of purifying exhaust gases by removing pollutants from exhaust gases with the use of wet scrubbing and reheating of the exhaust gases before they are discharged into the environment.

Processes of the above mentioned general type are known in the art. Such processes are much more effective than so-called dry or semidry processes of purifying exhaust gas as far as the separation rate is concerned but they require a treatment of the pollutant-containing scrubbing liquor and in most cases require also a reheating of the exhaust gases in order to avoid corrosion or even to avoid a formation of plumes by the exhaust gases as they enter the environment. A formation of a visible plume by the exhaust gas is often regarded as an indication of an excessive emission and for this reason a suppression of such plumes may even be required if this would not be necessary from the aspect of the pollution of the environment. Particularly at locations in densely populated regions it is not always sufficient to purify the exhaust gases by a process which consistently results in pollutant emissions which are lower than all permissible limits but it is also necessary to prevent under all weather conditions which may be expected the occurrence of the innocuous and inevitable emission of water vapor in a visible form.

That requirement can be defined in the known i,x graph of Mollier for humid air in that the state variables of the exhaust gas as it enters the environment and the varying state variables of the mixture consisting of the exhaust gas and the ambient air must always lie above the saturation curve. As the exhaust gases mix with the ambient air, the state variables will vary along a straight line, which is defined in the i,x graph by the values for the exhaust gas, on the one hand, and the values for the ambient air, on the other hand. If that straight line is entirely above the saturation curve, there will be no condensation of water vapor so that an exhaust gas plume will not be visible.

From the above, the requirement can be geometrically derived that with respect to a given point for the ambient air the state variables of the exhaust gas entering the environment must be so selected that they do not lie below a tangent from the predetermined point for the ambient air to the saturation curve. For this reason it is readily apparent that the temperature to which the exhaust gases must be reheated will be the higher the lower is the temperature of the ambient air. This means that the desired suppression of a formation of plumes may require under certain circumstances a considerable expenditure of energy so that the purification of exhaust gases by processes of said kind may be rejected owing to a lack of economy.

SUMMARY OF THE INVENTION

Accordingly, it is an object of the present invention to provide a process of purifying exhaust gases, which avoids the disadvantage of the prior art.

More particularly, it is an object of the present invention to improve the process described hereinbefore so that a formation of plumes by the purified exhaust gases as they enter the environment will be suppressed under all weather conditions which may be expected and that this can be accomplished with an expenditure of energy which will not adversely affect the competitiveness of the process of purifying exhaust gas.

That object is accomplished in accordance with the invention in that the exhaust gases which come from the wet scrubbing means and are saturated with water vapor are subjected to cooling and condensation in order to remove part of the water content from said exhaust gases before they are reheated. The exhaust gases are suitably cooled before they enter the wet scrubbing means and the energy which is thus recovered is utilized to reheat the exhaust gases before they enter the environment. In accordance with the invention the exhaust gases coming from the wet scrubbing means are cooled to such a degree and so much water is removed from said exhaust gases by condensation that the energy which has been recovered by the preliminary cooling (before the wet scrubbing) is sufficient to heat the exhaust gases before they enter the environment to such a degree that no plumes will be formed as the exhaust gases are mixed with the ambient air. The exhaust gases coming from the wet scrubbing means are suitably indirectly cooled and ambient air may be used for that purpose. The process in accordance with the invention can advantageously be used to purify exhaust gases from garbage incinerating plants.

The measure adopted in accordance with the invention results in a displacement of the state variables of the exhaust gases on the saturation curve in the i,x graph from a point further to the right to a point further to the left. When the exhaust gas is then reheated, the state variables will vary in the i,x graph along a vertical line.(constant water content). In comparison with a change of state at a higher water content, each tangent to the saturation curve (which tangent will depend on the state of the ambient air) is intersected at a lower temperature than in case of a change of state at a higher water content so that it will be sufficient to reheat the exhaust gases to a relatively lower temperature without an occurrence of plumes.

The cooling of the exhaust gases coming from the wet scrubbing means in the process in accordance with the invention has also the result that the temperature rise to be effected by the reheating of the exhaust gases is displaced to a lower temperature level so that the waste heat which is normally contained in the exhaust gas before the wet scrubbing will normally be sufficient for the reheating of the exhaust gases not only as regards quantity but also as regards quality. In other words, a sufficiently high temperature difference will always be available for the transfer of heat from the relatively hot exhaust gas stream to the purified and additionally cooled exhaust gas stream and the process in accordance with the invention will require only a reasonable expenditure as regards the heat exchanger surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing an i,x graph which illustrates an example and quantity of heat balance.

DESCRIPTION OF THE PREFERRED EMBODIMENT

Figure 1:
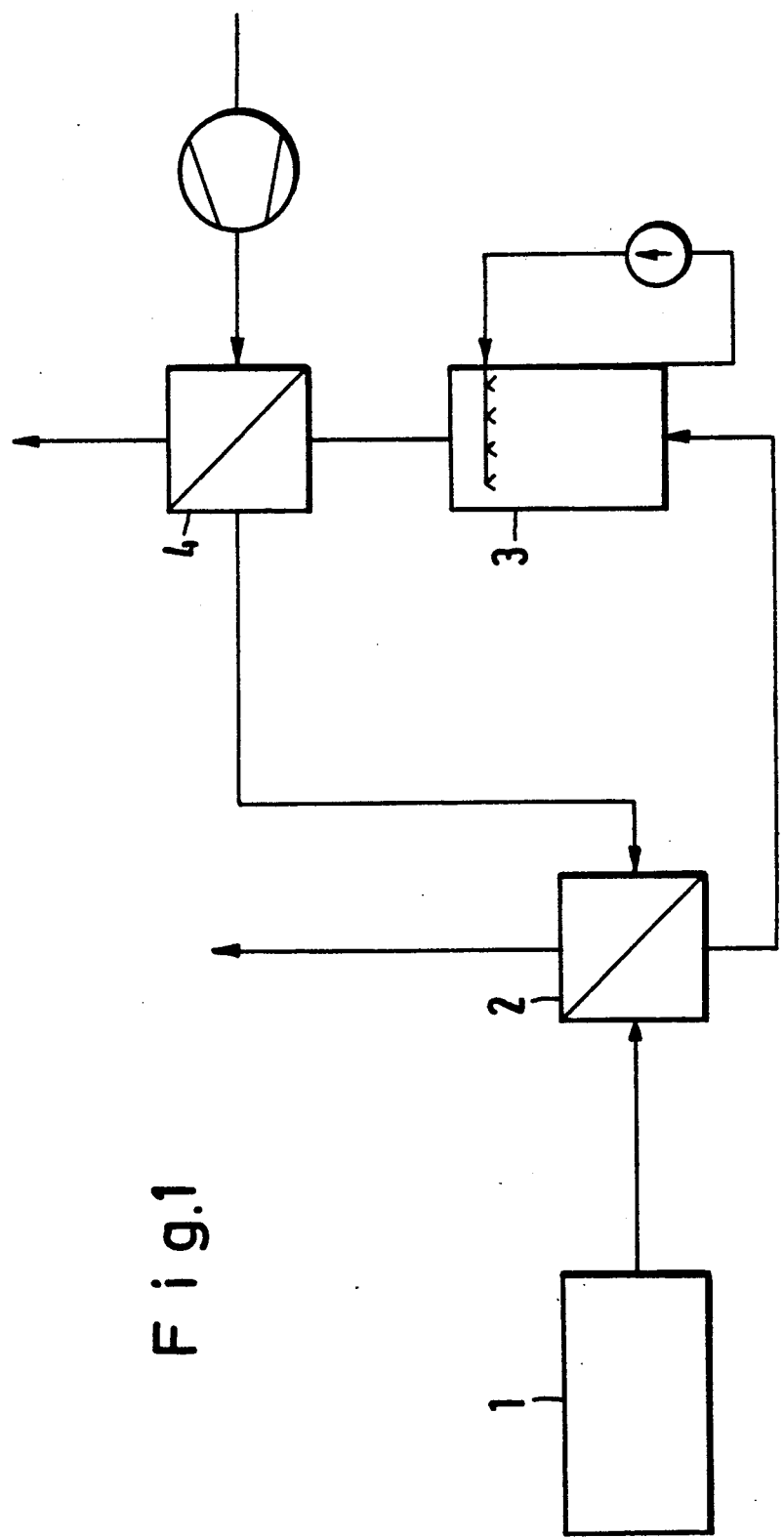
FIG. 1 shows a flow scheme of the process of purifying exhaust gases in accordance with the present invention.

In the combustor 1 shown in FIG. 1, an exhaust gas is formed, which must be purified before it is discharged into the environment. The purification is effected by means of a wet scrubber 3, which may be preceded on the upstream side by one or more purifying stages of any desired kind. The exhaust gas stream which has passed through the wet scrubber 3 is cooled further in a cooler 4 and is then reheated in a heat exchanger 2. For that purpose, the exhaust gas is used, which is relatively hot before it enters the wet scrubber 3. The additional cooling of the exhaust gas stream after the wet scubbing is preferably effected with ambient air. This will involve to some extent an automatic control because—if other parameters are constant—the temperature drop effected by the cooling will be the larger the lower is the temperature of the ambient air. Because the cooling power which is required for a suppression of a formation of plumes by the exhaust gases as they enter the environment will increase as the ambient temperature decreases, the additional cooling of the exhaust gases will always meet the requirements even in case of a change of the ambient air temperature, provided that the cooler is properly designed.

The following design data were assumed or determined in an application of the invention to a garbage incinerating plant, which produces $2 \times 27,700$ sm$^3$/h (sm$^3$=standard cubic meter). The exhaust gas has a temperature of 220 to 260° C. and is to be cooled in the heat exchanger by 90 to 110° C. before the exhaust gas is treated in the scrubber with circulated liquid at a rate of 90 to 120 sm$^3$/h and is thus cooled to 58 to 64° C. The water content of the exhaust gas amounts to 90 to 200 g/sm$^3$ at the entrance to the scrubber and to 175 to 250 g/sm$^3$ at the exit from the scubber. The pollutant contents are:

|  | Entrance | Exit |
| --- | --- | --- |
| Dust (g/sm$^3$) | 50 to 500 | 3 to 50 |
| SO$_2$ (g/sm$^3$) | 200 to 2000 | 15 to 150 |
| HCl (g/sm$^3$) | 400 to 2500 | 10 to 50 |
| HF (g/sm$^3$) | 5 to 50 | 0.1 to 2 |
| Hg (g/sm$^3$) | 0.2 to 1 | 0.05 to 0.2 |

The exhaust gases are then cooled in the cooler to 45 to 58° C. and the water content is reduced by condensation to 84 to 175 g/sm$^3$ at the same time. The exhaust gases are subsequently reheated to 120 to 200° C. before they are discharged into the environment.

The state variables corresponding to the mean values of the above-mentioned design data have been entered into the i,x graph shown in FIG. 2. A cooling from 220 to 120° C. is effected first (heat exchanger; points 11, 12, 13) whereas the water content is not changed. The water content of the exhaust gas is subsequently increased from 160 to 197 g/sm$^3$ and the temperature is decreased to 60° C. at the same time (points 3, 4). Thereafter the exhaust gas is cooled further to 52° C. by indirect cooling and the water content is thus decreased to 125 g/sm$^3$ (points 14, 15). This is succeeded by a heating by 110° C. so that an exhaust gas at 162° C. is finally obtained (points 15, 16, 17). As that exhaust gas is discharged into the ambient air, for which a temperature of $-2°$ C. is assumed, the state variables of the mixture change along the line (a) which is shown and which is seen to extend entirely above the saturation curve. This will ensure that no plumes will be formed by the exhaust gases as they enter the environment.

It will be understood that each of the elements described above, or two or more together, may also find a useful application in other types of processes differing from the types described above.

While the invention has been illustrated and described as embodied in a process of purifying exhaust gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A process for purifying a hot exhaust gas by removing pollutants from the exhaust gas, comprising the steps of indirectly cooling of the hot exhaust gas in indirect heat exchange means; wet scrubbing of the exhaust gas from said heat exchange means in a wet scrubbing zone and saturating the exhaust gas with water vapor in said scrubbing zone; indirect cooling of the exhaust gas from said scrubbing zone in a cooling zone; feeding ambient air to said cooling zone as a cooling medium; in said cooling zone condensing a part of the water vapor of the exhaust gas and removing condensed water from said cooling zone; feeding cooled exhaust gas from the cooling zone through said indirect heat exchange means as the cooling medium and then cleaning the cooled exhaust gas; and discharging reheated exhaust gas into the environment.

2. A process as defined in claim 1, wherein the cooled exhaust gas coming from the wet scrubbing means is being heated to such a degree that no plumes will be formed as the exhaust gas is discharged into the environment.

3. A process for purifying a hot exhaust gas formed in a garbage incinerating plant by removing pollutants from the exhaust gas, comprising the steps of indirectly cooling of the hot exhaust gas in indirect heat exchange means; wet scrubbing of the exhaust gas from said heat exchange means in a wet scrubbing zone and saturating the exhaust gas with water vapor in said scrubbing zone; indirect cooling of the exhaust gas from said scrubbing zone in a cooling zone; feeding ambient air to said cooling zone; condensing a part of the water vapor of the exhaust gas and removing condensed water from said cooling zone; feeding cooled exhaust gas from the cooling zone through said indirect heat exchange means as the cooling medium; and then discharging the cleaned, reheated exhaust gas into the environment.

* * * * *